(12) United States Patent
Deng et al.

(10) Patent No.: US 12,543,935 B2
(45) Date of Patent: Feb. 10, 2026

(54) ROBOT SYSTEM AND CONTROL METHOD FOR NASOTRACHEAL INTUBATION

(71) Applicant: FUZHOU UNIVERSITY, Fujian (CN)

(72) Inventors: Zhen Deng, Fujian (CN); Xiaochun Zheng, Fujian (CN); Bingwei He, Fujian (CN); Yuxin Guo, Fujian (CN); Chuanchuan Pan, Fujian (CN); Ting Zheng, Fujian (CN); Fei Gao, Fujian (CN)

(73) Assignee: FUZHOU UNIVERSITY, Fuzhou (CN)

(*) Notice: Subject to any disclaimer, the term of this patent is extended or adjusted under 35 U.S.C. 154(b) by 302 days.

(21) Appl. No.: 18/465,592

(22) Filed: Sep. 12, 2023

(65) Prior Publication Data
US 2024/0358241 A1  Oct. 31, 2024

Related U.S. Application Data

(63) Continuation of application No. PCT/CN2023/103713, filed on Jun. 29, 2023.

(30) Foreign Application Priority Data

Apr. 27, 2023 (CN) .......................... 202310467053.3

(51) Int. Cl.
*A61B 1/01* (2006.01)
*A61B 1/00* (2006.01)
*A61B 1/267* (2006.01)

(52) U.S. Cl.
CPC ............ *A61B 1/01* (2013.01); *A61B 1/00147* (2013.01); *A61B 1/00149* (2013.01); *A61B 1/0016* (2013.01); *A61B 1/2676* (2013.01)

(58) Field of Classification Search
CPC ......... A61B 1/01; A61B 1/2676; A61B 34/37; A61B 1/00147; A61B 1/00149
See application file for complete search history.

(56) References Cited

U.S. PATENT DOCUMENTS 5,876,325 A * 3/1999 Mizuno .................. A61B 34/37
600/117
2010/0249507 A1* 9/2010 Prisco .................. A61B 1/0002
600/117

* cited by examiner

*Primary Examiner* — Aaron B Fairchild
(74) *Attorney, Agent, or Firm* — Pilloff Passino & Cosenza LLP; Rachel K. Pilloff; Sean A. Passino

(57) ABSTRACT

A robot system and a control method for nasotracheal intubation are provided. The robot system for nasotracheal intubation includes an operation console and an intubation operation device arranged at a bedside end of a mobile operating bed through a passive supporting arm. The intubation operation device includes a bronchoscope and a catheter connected with the bronchoscope, a bronchoscope bending device for controlling a tip of the bronchoscope to bend, a bronchoscope rotating device for controlling the bronchoscope to rotate integrally, a bronchoscope conveying device for controlling the bronchoscope to feed and withdraw, and a roller conveying device for controlling the catheter to feed in an auxiliary way. The intubation operation device is installed on the passive supporting arm through a supporting frame, and the tip of the bronchoscope corresponds to a position of a nasal cavity of a patient on the mobile operating bed.

5 Claims, 12 Drawing Sheets

ROBOT SYSTEM AND CONTROL METHOD FOR NASOTRACHEAL INTUBATION

CROSS-REFERENCE TO RELATED APPLICATIONS

This application is a continuation of PCT/CN2023/103713, filed on Jun. 29, 2023 and claims priority to Chinese Patent Application No. 202310467053.3, filed on Apr. 27, 2023, the contents of which are hereby incorporated by reference.

TECHNICAL FIELD

The application belongs to the technical field of medical equipment, and in particular to a robot system and a control method for nasotracheal intubation.

BACKGROUND

In recent years, with the rapid development of computers, image processing and robotics, the field of medical surgical instruments has been developed rapidly. A growing number of people realize the benefits of excellent characteristics of medical devices in clinical practice, and more standardized and efficient medical services are provided by applying medical devices. It is also easier and safer for medical workers to complete treatment on patients by applying medical devices in clinic.

In the process of treating severe patients with respiratory distress, the operation with the highest risk of exposure for medical staff is tracheal intubation. Patients choke because of intubation stimulation, which produces a lot of droplets and aerosols, greatly increasing the risk of infection of medical workers. Besides, because the patient's upper respiratory tract has a long and narrow structure, the monocular camera at the tip of bronchoscope only provides a partial view for the surgeon. Doctors need to quickly identify various anatomical characteristics of the human body. Moreover, the classic flexible endoscope requires the doctor to turn the endoscope tip, push or pull the endoscope in combination with multiple actions according to limited degrees of flexibility. This requires doctors to operate bronchoscope accurately, stably and quickly while quickly identifying the anatomical characteristics of human body. Therefore, the overall operation is more difficult, which increases the cognitive and operational burden of doctors.

With robots instead of doctors performing awake bronchoscope intubation, the burden on doctors is lessened and the quality of surgery is improved. However, there is little study on robotic nasotracheal intubation at home and abroad, and there are only a few reports on oral tracheal intubation. Mcgill University, Canada, has developed an orotracheal intubation surgical robot operated by remote control. Naval Military Medical University has also developed a robot system for orotracheal intubation based on remote operation. In the above two systems, the robot is not able to identify the key anatomical characteristics independently, and it relies heavily on experienced doctors for intubation operation. Moreover, the robot mechanism is complex and huge, which is not convenient to carry and transport, so its practical significance is limited. The surgical operation of robotic laryngoscope and endoscopic insertion are explored, but the robot has rigid actions and depends heavily on the experience of doctors.

Moreover, the existing robot lacks the ability of image perception, which requires doctors to determine the moving target of bronchoscope by analyzing images, and hence increases the cognitive burden of doctors. The image characteristics extracted by the algorithm are the key factors to determine the recognition effect. For example, the hand-held oral intubation robot of the Federal Institute of Technology in Zurich assists doctors to intubate by recognizing the Haar characteristics of the airway and glottis. R. Reilink et al. segmented the dark areas of the images based on the principle of image intensity characteristics and get the target that can be assumed as the center of the cavity. The algorithm based on adaptive threshold of C. S. Bell et al. segmented the darkest region and got the target that can be assumed as the center of the cavity.

Therefore, it is urgent to design a robot system for nasotracheal intubation, which makes the robot operate the flexible bronchoscope and tracheal catheter in a narrow working space to complete the tracheal intubation operation. Moreover, the application further enriches the control method of the surgical robot system, and the robot may be remotely controlled to complete the intubation operation by using the image processing technology and the Proportion Integration Differentiation (PID)-based control strategy.

SUMMARY

The purpose of the present application is to provide a robot system and a control method for nasotracheal intubation, so as to solve the above problems, realize the characteristics recognition of dark areas such as nasal cavity, throat, glottis and trachea, and assist doctors in completing awake nasotracheal intubation.

In order to achieve the above objectives, the present application provides the following scheme.

A robot system for nasotracheal intubation includes an operation console and an intubation operation device. The intubation operation device is arranged at the bedside end of the mobile operating bed through a passive supporting arm.

The intubation operation device includes a bronchoscope and a catheter connected with the bronchoscope, a bronchoscope bending device for controlling a tip of the bronchoscope to bend, a bronchoscope rotating device for controlling the bronchoscope to rotate integrally, a bronchoscope conveying device for controlling the bronchoscope to feed and withdraw, and a roller conveying device for controlling the catheter to feed in an auxiliary way.

The intubation operation device is installed on the passive supporting arm through a supporting frame.

And the tip of the bronchoscope corresponds to the position of the nasal cavity of the patient on the mobile operating bed.

The bronchoscope includes a display and a scope body. The display and the scope body are connected through an operation part. A control knob is rotatably mounted on the operating part. The bronchoscope bending device controls the bending part to bend through the control knob.

The scope body is provided with the catheter. The extended tail end of the scope body is formed with a bending part.

The operating part is supported on the bronchoscope conveying device. The bronchoscope conveying device is fixedly installed on the bronchoscope rotating device. One end of the catheter is defined on the bronchoscope rotating device. The other end of the catheter and the bending part are defined on the roller conveying device.

The supporting frame includes a rotating motor supporting bracket used for fixing the rotating motor in the bronchoscope rotating device, a bottom plate and a mechanical arm connector both are used for connecting with the passive supporting arm. One end of the bottom plate is fixedly connected with the rotating motor supporting bracket through an upper bearing seat, and the other end of the bottom plate is connected with an end connecting plate through a lower bearing seat. The end connecting plate is fixedly connected with an end connecting frame for supporting the roller conveying device.

The bronchoscope bending device includes a knob-operated motor, where the knob-operated motor is fixedly installed at one side of a knob-operated motor fixing bracket, and the other side of the knob-operated motor fixing bracket is provided with a knob motor connector fixedly connected with the output end of the knob-operated motor. The knob motor connector is internally provided with an embedding groove, and the control knob is fixedly installed in the embedding groove. The knob-operated motor fixing bracket is installed on the clamping mechanism of the bronchoscope conveying device.

The bronchoscope rotating device also includes a rotating motor coupling coaxially arranged with the rotating motor. The rotating motor is in transmission connection with an upper main bracket coupling connector through a rotating motor coupling, and the upper main bracket coupling connector is installed in the upper bearing seat.

The upper main bracket coupling connector is also fixedly connected with the upper main bracket. The upper main bracket is fixedly connected with the lower main bracket through a supporting plate. The lower main bracket is provided with an installation hole for fixing the catheter. The catheter is rotatably installed in the lower bearing seat. The upper main bracket and the lower main bracket are both defined above the supporting plate.

The bronchoscope conveying device includes the clamping mechanism and feed slide rails. There are two feed slide rails arranged, and both ends of the feed slide rails are respectively fixedly installed at the bottoms of the upper main bracket and the lower main bracket. A feed slider is slidably arranged on the two feed slide rails. The clamping mechanism is installed on the feed slider through a feed slider connector. The feed slider is fixedly installed on the feed screw nut. The feed screw nut is slidably installed on the feed screw. The two sides of the feed screw are respectively provided with a feed screw upper end bracket and a feed screw lower end bracket. The feed screw lower end bracket is fixedly connected with the side wall of the lower main bracket. The feed screw is also in transmission connection with the feed motor through a feed screw coupling. The feed screw coupling is fixedly connected with the feed screw upper end bracket. The feed screw is fixedly installed at the bottom of the feed slide rails through a feed motor bracket.

The clamping mechanism includes a fixing upper bracket and a fixing lower bracket both installed on the feed slider connector. The tops of the fixing upper bracket and the fixing lower bracket are jointly provided with a connecting rod. The connecting rod is installed with a locking bracket by threads, and the locking bracket penetrates through the operating part. The end of the connecting rod is also rotatably connected with a clamping frame through a rotating shaft. The clamping frame is fixedly connected with the operating part.

The roller conveying device includes a catheter fixing part and a roller adjusting part. The catheter fixing part includes a linear actuator, and the linear actuator is fixedly installed on the end connecting frame through a linear actuator bracket. The linear actuator is in transmission connection with a push rod screw through a push rod screw coupling. The push rod screw is fixedly arranged on the end connecting frame through a push rod screw lower bracket.

The two side of the linear actuator are respectively provided with a tracheal lower bracket stop block. Two tracheal lower bracket stop blocks are abutted with tracheal lower brackets. Each of the tracheal lower brackets is connected with the tracheal upper bracket through a rotating shaft and a spring. One side of the tracheal upper bracket is also fixedly arranged on the end connecting plate. The catheter penetrates through the tracheal lower bracket.

A push rod is installed on the push rod screw in a transmission way. The push rod is provided with the roller adjusting part.

The roller adjusting part includes a bronchoscope lower stop block, and the bronchoscope lower stop block is fixedly installed at the top of the push rod. The bronchoscope lower stop block is also fixedly provided with a bronchoscope upper stop block. One end of the push rod away from the push rod screw is fixedly provided with a propulsion slide plate. One side of the propulsion slide plate is fixedly provided with a clamping motor. The clamping motor is in transmission connection with the clamping lead screw through a clamping lead screw coupling. A clamping slider is slidably installed on the clamping lead screw. The clamping slider is slidably arranged on the clamping slide rail, and the clamping slide rail is fixedly installed on the slide rail supporting plate. The slide rail supporting plate is fixedly installed on the end connecting frame.

The clamping lead screw is also penetrated with two oppositely arranged roller brackets. A roller is arranged in each of the two roller brackets, and the bending part is clamped on the two rollers. The rollers are driven by a roller motor, and the roller motor is fixedly installed on a roller motor bracket. The roller motor bracket is fixedly arranged at the top of the roller brackets. The bottom of the roller brackets is fixedly installed on the clamping slider.

The propulsion slide plate is also fixedly installed on the propulsion slider. The propulsion slider is slidably arranged on the propulsion slide rail. One side of the propulsion slide plate is provided with a clamping limit photoelectric switch through a clamping limit photoelectric switch bracket. Two ends of the direction of the slide rail supporting plate parallel to the push rod are respectively provided with a push rod back-end photoelectric switch and a push rod front-end photoelectric switch. The propulsion slide plate is arranged above the slide rail supporting plate, and the bottom surface of the propulsion slide plate is also fixedly provided with an end push rod limiting rod. The end push rod limiting rod is arranged between the push rod back-end photoelectric switch and the push rod front-end photoelectric switch.

The application relates to a control method of a robot system for nasotracheal intubation, which includes following steps:

S1, passing a bronchoscope through a natural bore and entering a cavity of a human body to obtain information on an image of the cavity of the human body, and detecting a center of the cavity by an image comprehensive processing module of an operation console according to a dark area in the image;

S2, observing data of the operation console by an operator, and operating a control joystick on the operation console according to a position of the center of the cavity, where there is an error between the center of the cavity and a center of the image in an coordinate system of the image, mapping a movement amount of the control joystick into a speed of rotation, bending and feeding of the bronchoscope operated by an intubation operation device when the error is large; and S3, taking the error between the center of cavity and the center of image as an input amount when the error is small, and mapping the input amount into the speed of rotation, bending and feeding of the bronchoscope operated by the intubation operation device through the Proportion Integration Differentiation (PID) controller of the operation console, so as to move the center of cavity to the desired position.

Compared with the prior art, the application has the following advantages and technical effects:

Firstly, the robot is able to identify key anatomical characteristics autonomously, and assist the doctor to complete the endoscopic operation when the pixel error is small.

Secondly, the robot is simple in structure, small in size and convenient to carry and transport.

Lastly, the doctor is able to remotely operate the endoscope through the robot to complete the surgery, which solves the problem of risk of high cross-infection in the treatment of infectious diseases.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

Figure 1:
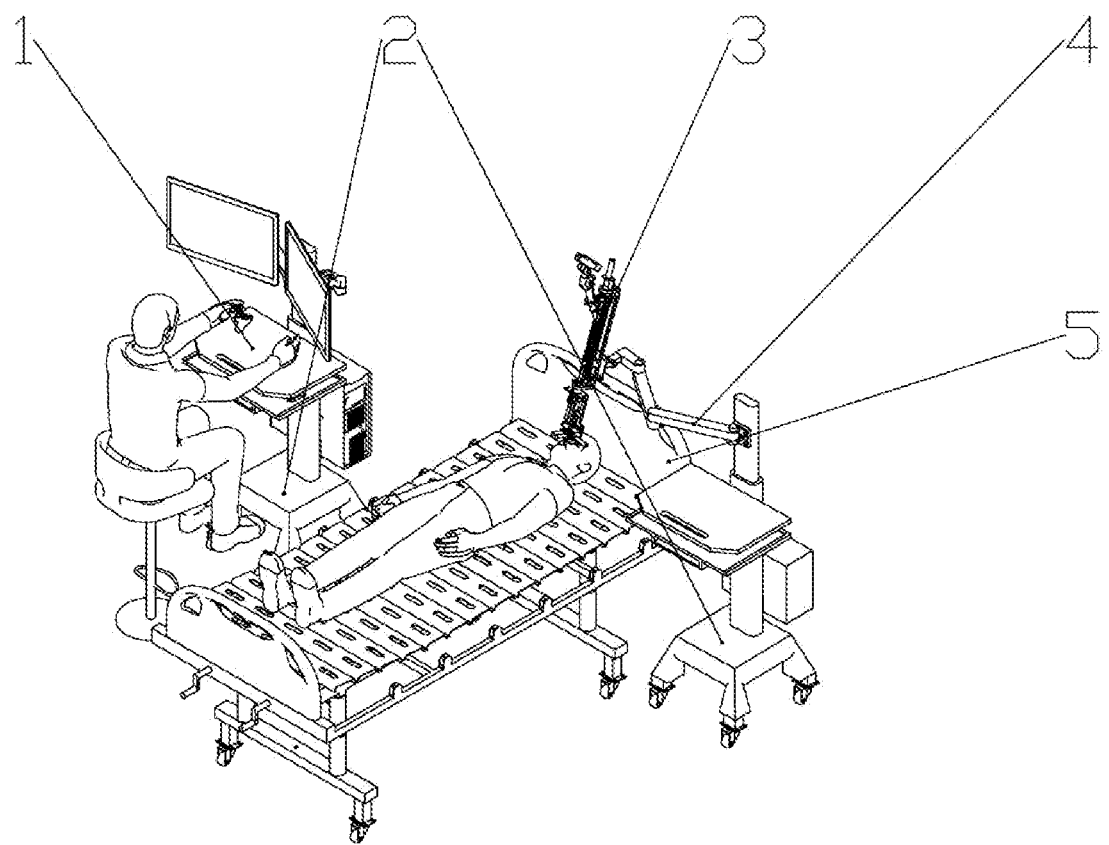
FIG. 1 is a schematic diagram of an overall structure of the present application.
Figure 2:
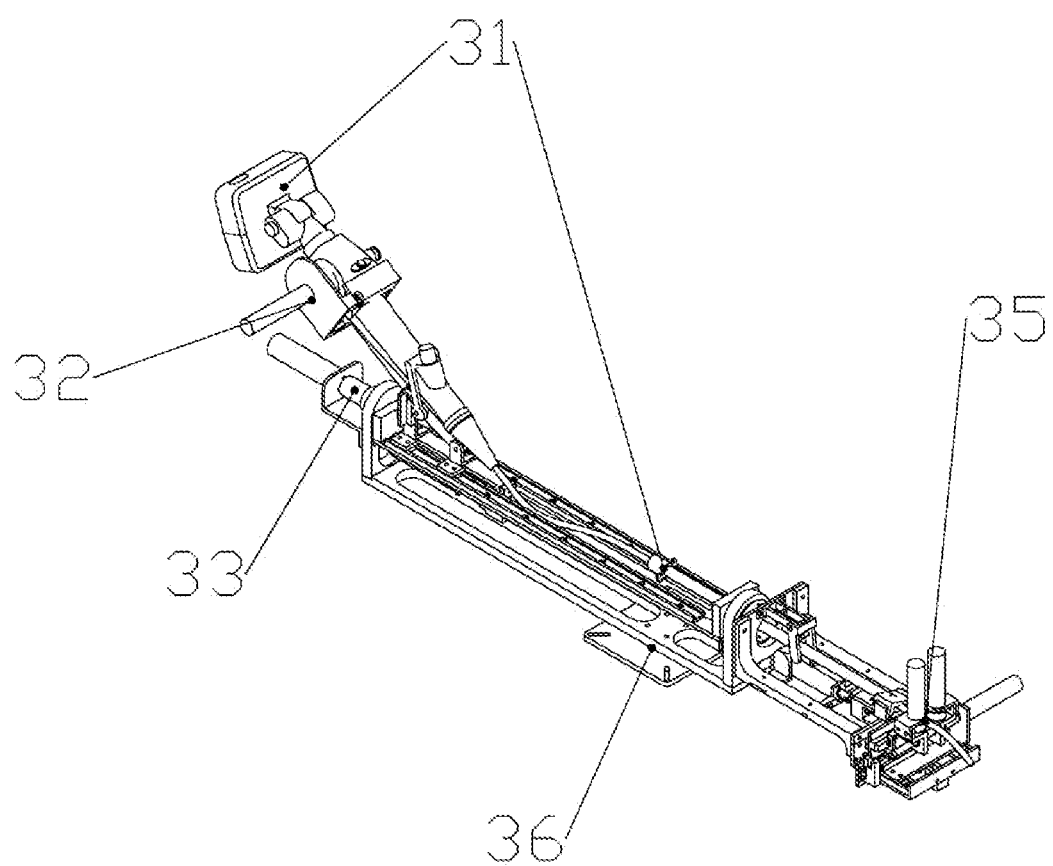
FIG. 2 is a structural schematic view of an intubation operation device.
Figure 3:
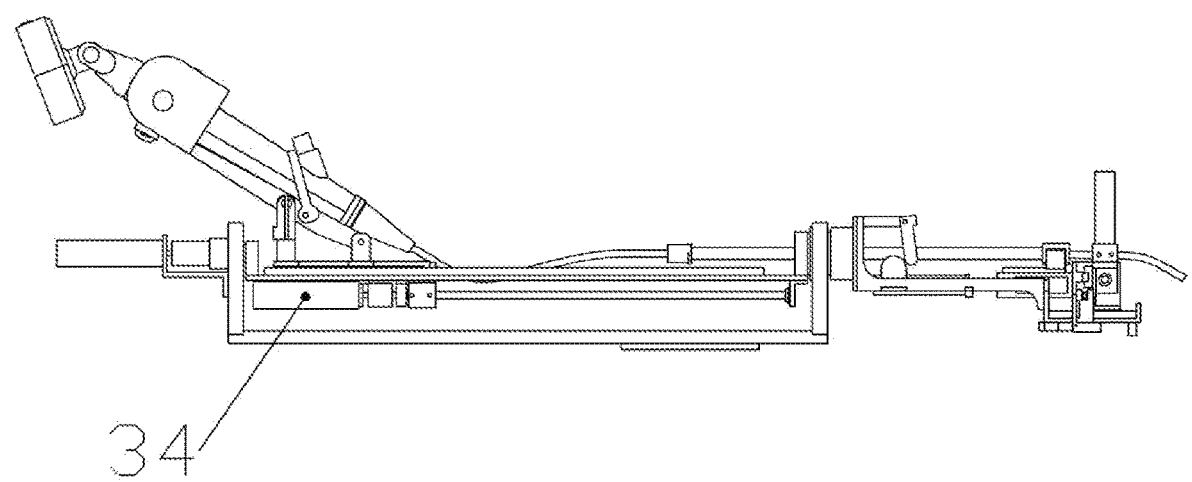
FIG. 3 is a structural side view of an intubation operation device.
Figure 4:
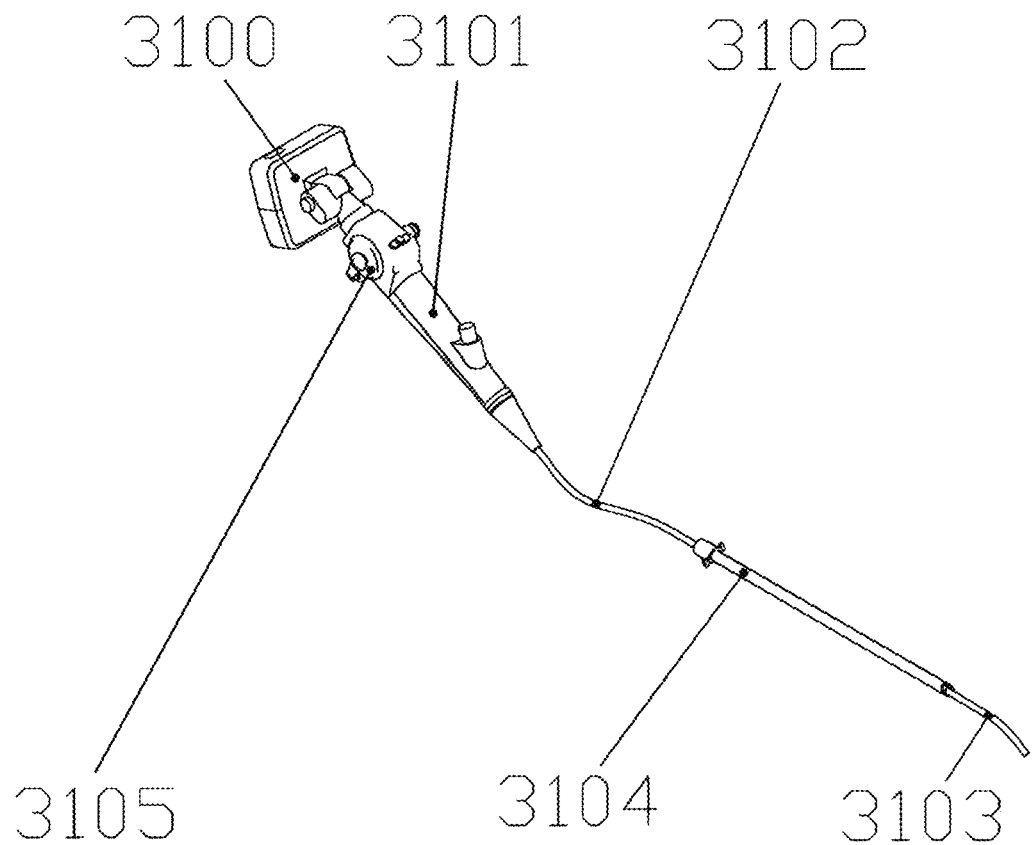
FIG. 4 is a structural schematic view of a bronchoscope.
Figure 5:
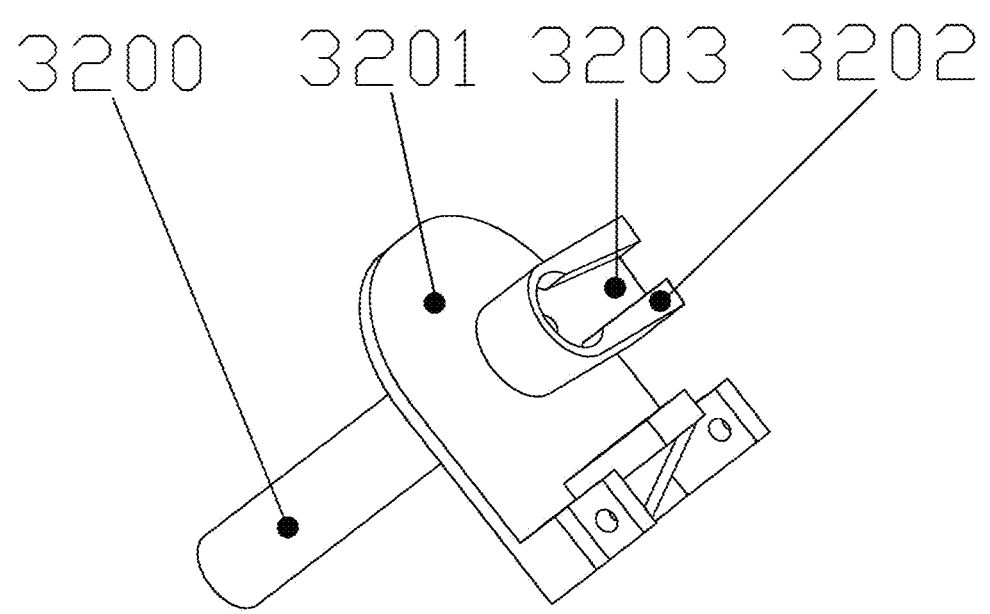
FIG. 5 is a structural schematic view of a bronchoscope bending device.
Figure 6:
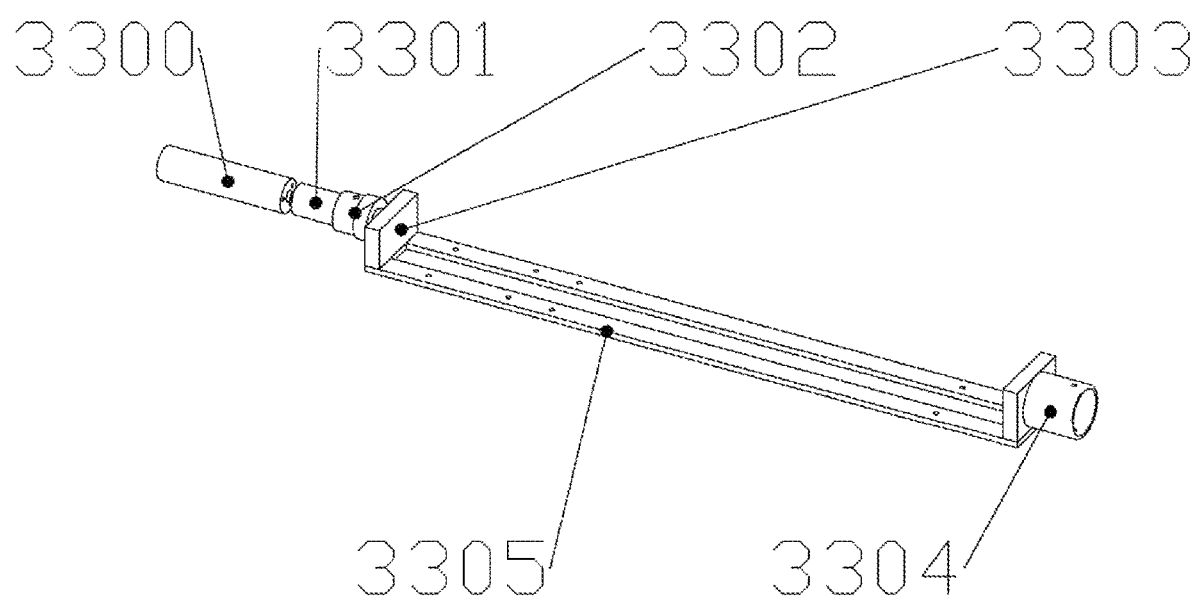
FIG. 6 is a structural schematic view of a bronchoscope rotating device.
Figure 7:
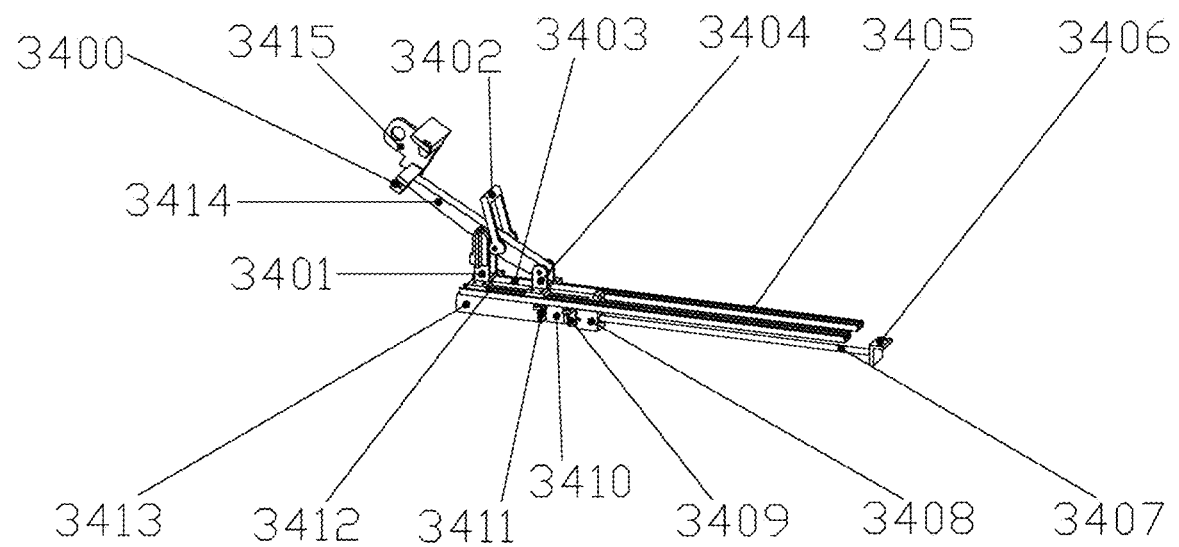
FIG. 7 is a structural schematic view of a bronchoscope conveying device.
Figure 8:
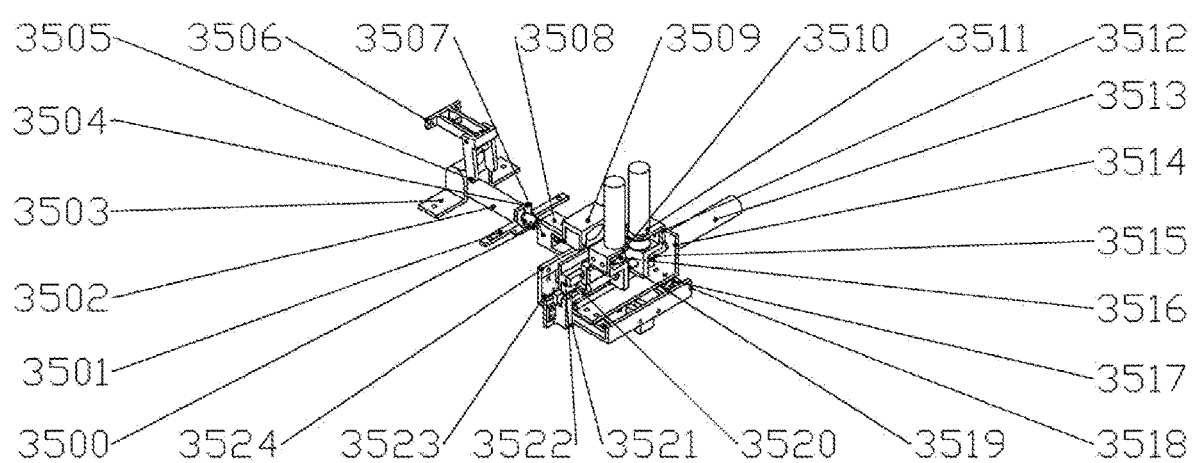
FIG. 8 is a structural schematic diagram of a roller conveying device.
Figure 9:
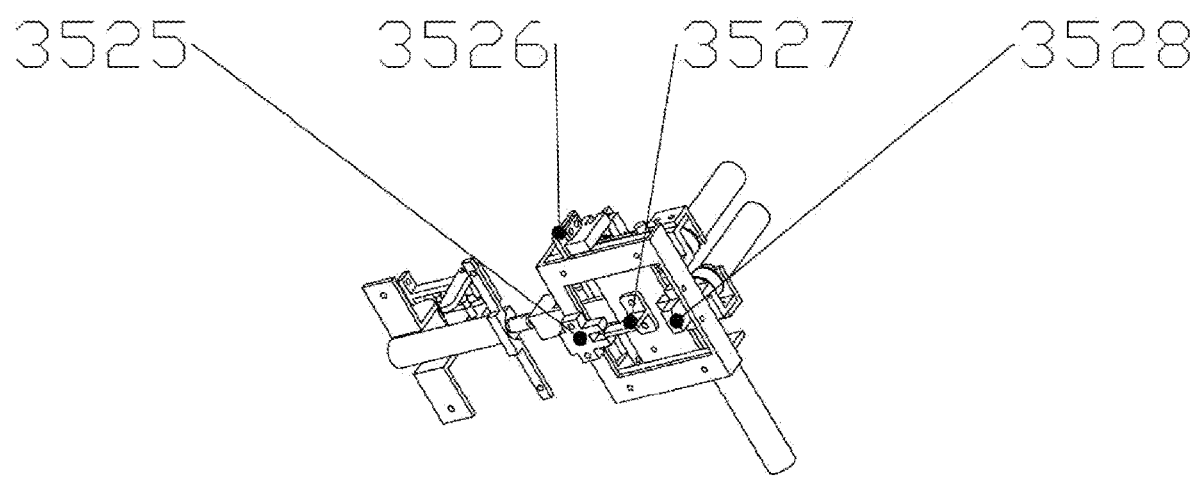
FIG. 9 is a structural bottom view of a roller conveying device.
Figure 10:
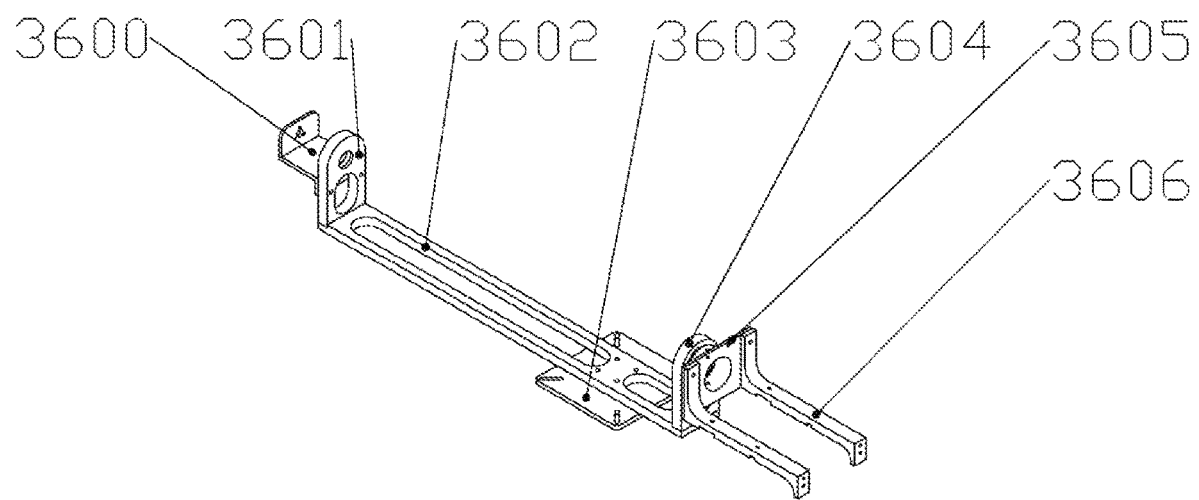
FIG. 10 is a structural schematic view of a supporting frame.

In the following, the technical scheme in the embodiments of the application will be clearly and completely described with reference to the attached drawings. Obviously, the described embodiments are only a part of the embodiments of the application, but not the whole embodiments. Based on the embodiments in the present application, all other embodiments obtained by ordinary technicians in the field without creative labor belong to the scope of protection of the present application.

In order to make the above objects, characteristics and advantages of the present application more obvious and easier to understand, the present application will be further described in detail with the attached drawings and specific embodiments.

A robot system for nasotracheal intubation includes an operation console 1 and an intubation operation device 3, where the intubation operation device 3 is arranged at a bedside end of a mobile operating bed 5 through a passive supporting arm 4.

The intubation operation device 3 includes a bronchoscope 31 and a catheter 3104 connected with the bronchoscope 31, a bronchoscope bending device 32 for controlling a tip of the bronchoscope 31 to bend, a bronchoscope rotating device 33 for controlling the bronchoscope 31 to rotate integrally, a bronchoscope conveying device 34 for controlling the bronchoscope 31 to feed and withdraw, and a roller conveying device 35 for controlling the catheter 3104 to feed in an auxiliary way.

The intubation operation device 3 is installed on the passive supporting arm 4 through a supporting frame 36.

The tip of the bronchoscope 31 correspond to a position of a nasal cavity of a patient on the mobile operating bed 5.

Further, the intubation operation device 3 has a total of five degrees of freedom. The bronchoscope bending device 32 is controlled by the bending motor to bend the end of the bronchoscope up and down, and the bronchoscope rotating device 33 is controlled by the rotating motor to rotate the bronchoscope. The feeding of the scope body of the bronchoscope is realized by controlling the bronchoscope screw slider of the bronchoscope conveying device 34 by the bronchoscope feed motor, and the auxiliary feeding of bronchoscope and catheter is realized by controlling the rollers of the roller conveying device 35 by the roller motor. The clamping motor clamps the bronchoscope and catheter by a pair of rollers through the flange of the roller conveying device, and is also able to adapt to catheters with different sizes and provide appropriate pre-tightening force. The feeding of catheter is realized by controlling the pushing-releasing mechanism by the linear actuator.

In one embodiment of the present application, more specifically, the bottoms of the operation console 1 and the passive supporting arm 4 are also provided with a movable bracket 2, respectively, which is convenient for adjusting the positions of the operation console 1 and the intubation operation device 3.

Figure 11:
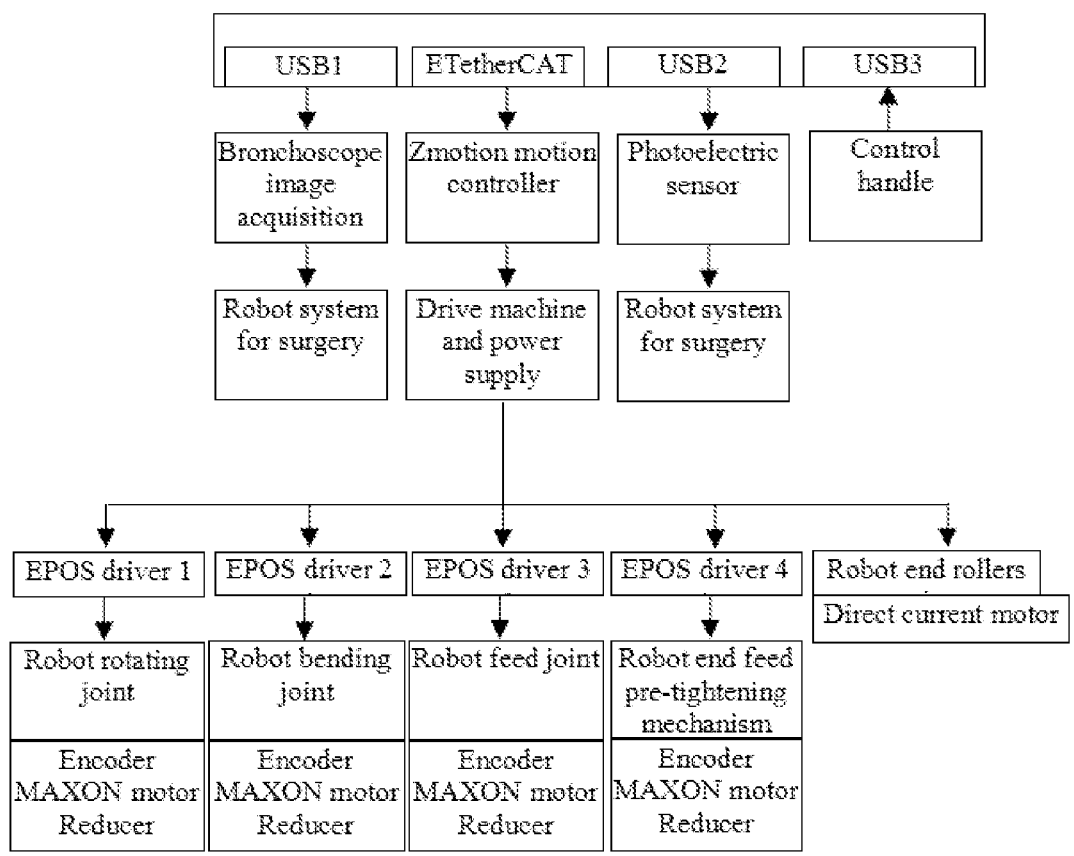
FIG. 11 is a schematic diagram of a control framework.

Further, the passive supporting arm 4 is used to adjust the posture of the intubation operation device 3 to ensure that the posture of the intubation operation device 3 is able to adapt to the position of the nasal cavity of the patient. The operating bed 5 is used to place the head posture of the patient and determine the nasal posture at the same time. The movable bracket 2 is used for fixing and supporting the intubation operation device and the passive supporting arm In one embodiment of the present application, as shown in FIG. 11, the operation console 1 includes a master control platform and a slave control platform. The master control platform includes a control joystick and a workstation. The slave control platform is mainly a control cabinet.

As the upper computer, the workstation is connected with the control joystick and the slave control platform. The surgery planning module of the workstation is used to receive the instructions of the control joystick and carry out algorithm processing, and transmit the control information to the motor controller. The motor controller controls the movement of the intubation operation device.

Furthermore, there is an image comprehensive processing module on the workstation. The image comprehensive processing module is used to extract the visual information of the two-dimensional picture, and the visual information is used for the motion planning of the intubation operation device. The image comprehensive processing module includes image processing sub-module and display sub-module. The image processing sub-module collects the image information in the surgery area, transmits the image information to the image processing module to extract the center of cavity, and display the picture containing the center of cavity on the display screen of the workstation. In addition, the display screen also displays the states of the control joystick and the motor in the control cabinet.

Further, the slave control platform is a control cabinet, and a robot control system is arranged in the control cabinet. The robot control system is connected with the upper computer (workstation) and the bending motor for driving bending, a rotating motor for driving rotation, a feed motor for driving the bronchoscope 31 to feed, a roller motor for driving the clamping mechanism, a clamping motor for driving the rollers and a linear actuator for driving the pushing-releasing mechanism, and a lower computer (controller) and a driver are loaded.

In one embodiment of the present application, more specifically, the robot control system includes a bronchoscope guiding module. The bronchoscope guiding module is used to control the end of the bronchoscope to bend up and down through the bending motor of the operating part after the end of the bronchoscope 31 enters the nasal cavity of the patient. The clamping mechanism is pre-adjusted to the position just shielding the photoelectric door, the clamping motor passes through the well-set position, the clamping motor clamps the bronchoscope by controlling the clamping mechanism, and the feed motor and the roller motor are able to control the bronchoscope screw slider module of the bronchoscope conveying device and the rollers of the roller conveying device to feed the scope body of the bronchoscope. The rotation of the front-end actuator is controlled by the rotating motor, so that the bronchoscope is able to rotate integrally.

The tracheal intubation module is used for stopping the movement of the bronchoscope conveying device after the end of the bronchoscope reaches the trachea and the trachea bulge is observed in the display sub-module of the image comprehensive processing module. The clamping mechanism of the roller conveying device is rotated reversely by the motor until the photoelectric door shows that the lead screw is rotated reversely to a proper position, indicating that the bronchoscope is released. The clamping motor clamps the catheter through the pre-adjusted position. Then, the roller motor and the linear actuator control the rollers and pushing-releasing mechanism of the roller conveying device to realize the clamping and feeding of the catheter. The roller motor is able to realize the clamping of the catheter (bronchoscope) by two pairs of rollers through the flange of the roller conveying device, so as to adapt to different sizes of catheters and provide appropriate pre-tightening force.

In one embodiment of the application, the left rocker in the control joystick is used to control the feed motor and the roller motor. When the left rocker is moving along the positive direction of the y-axis, the intubation operation device controls the bronchoscope to feed. When the left rocker is moving along the negative direction of the y-axis, the intubation operation device controls the bronchoscope to retreat. The right rocker is used to control the rotating motor and the bending motor. When the right rocker is moving along the positive direction of y-axis, the intubation operation device controls the end of the bronchoscope to bend upward. When the right rocker is moving along the negative direction of y-axis, the intubation operation device controls the end of the bronchoscope to bend downward. When the right rocker moves along the positive direction of the x-axis, the intubation operation device controls the bronchoscope to rotate clockwise. When the right rocker moves along the negative direction of the x-axis, the intubation operation device controls the bronchoscope to rotate counterclockwise. The key X of the control joystick is used to control the clamping mechanism to clamp the endoscope by the clamping motor, and the key B of the control joystick is used to open the clamping mechanism by controlling the clamping motor.

The key Y of the control joystick is used to close the clamping mechanism by controlling the clamping motor to clamp the catheter. The key A of the control joystick controls the pushing-releasing motor to start the pushing-releasing mechanism and the roller motor to start the rollers, and then it stops when released.

The bronchoscope 31 includes a display 3100 and a scope body 3102. The display 3100 and the scope body 3102 are connected through an operating part 3101. A control knob 3105 is rotatably mounted on the operating part 3101. The bronchoscope bending device 32 controls the bending part 3103 to bend through the control knob 3105.

The scope body 3102 is provided with the catheter 3104. An extended end of the scope body 3102 is formed with the bending part 3103.

The operating part 3101 is supported on the bronchoscope conveying device 34. The bronchoscope conveying device 34 is fixedly installed on the bronchoscope rotating device 33, and one end of the catheter 3104 is defined on the bronchoscope rotating device 33; the other end of the catheter 3104 and the bending part 3103 are defined on the roller conveying device 35.

The supporting frame 36 includes a rotating motor supporting bracket 3600 for fixing a rotating motor 3300 in the bronchoscope rotating device 33, a bottom plate 3602 and a mechanical arm connector 3603 both are used for connecting with the passive supporting arm 4. One end of the bottom plate 3602 is fixedly connected with the rotating motor supporting bracket 3600 through an upper bearing seat 3601, and the other end of the bottom plate 3602 is connected with an end connecting plate 3605 through a lower bearing seat 3604. The end connecting plate 3605 is fixedly connected with an end connecting frame 3606 for supporting the roller conveying device 35.

The bronchoscope bending device 32 includes a knob-operated motor 3200, the knob-operated motor 3200 is fixedly installed on one side of a knob-operated motor fixing bracket 3201, and an other side of the knob-operated motor fixing bracket 3201 is provided with a knob motor connector 3202 fixedly connected with an output end of the knob-operated motor 3200. The knob motor connector 3202 is internally provided with an embedding groove 3203, and a control knob 3105 is fixedly installed in the embedding groove 3203. The knob-operated motor fixing bracket 3201 is installed on a clamping mechanism 3400 of the bronchoscope conveying device 34.

The upper main bracket coupling connector 3302 is also fixedly connected with an upper main bracket 3303. The upper main bracket 3303 is fixedly connected with a lower main bracket 3304 through a supporting plate 3305. The lower main bracket 3304 is provided with an installation hole for fixing the catheter 3104. The catheter 3104 is rotatably installed in the lower bearing seat 3604. The upper main bracket 3303 and the lower main bracket 3304 are both defined above the supporting plate 3305.

The bronchoscope conveying device 34 includes the clamping mechanism 3400 and feed slide rails 3405. Two feed slide rails 3405 are arranged and both ends of the feed slide rails 3405 are respectively fixedly installed at bottoms of the upper main bracket 3303 and the lower main bracket 3304. A feed slider 3412 is slidably arranged on the two feed slide rails 3405. The clamping mechanism 3400 is installed on the feed slider 3412 through a feed slider connector 3403. The feed slider 3412 is fixedly installed on a feed screw nut 3408. The feed screw nut 3408 is slidably installed on a feed screw 3407. Two sides of the feed screw 3407 are respectively provided with a feed screw upper end bracket 3409 and a feed screw lower end bracket 3406. The feed screw lower end bracket 3406 is fixedly connected with a side wall of the lower main bracket 3304. The feed screw 3407 is also in transmission connection with a feed motor 3413 through a feed screw coupling 3410. The feed screw coupling 3410 is fixedly connected with the feed screw upper end bracket 3409. The feed screw 3407 is fixedly installed at a bottom of the feed slide rails 3405 through a feed motor bracket 3411.

The clamping mechanism 3400 includes a fixing upper bracket 3401 and a fixing lower bracket 3404 both mounted on the feed slider connector 3403. Tops of the fixing upper bracket 3401 and the fixing lower bracket 3404 are jointly provided with a connecting rod 3414. The connecting rod 3414 is connected with a locking bracket 3402 by threads, and the locking bracket 3402 penetrates through the operating part 3101. An end of the connecting rod 3414 is also rotatably connected with a clamping frame 3415 through a rotating shaft. The clamping frame 3415 is fixedly connected with the operating part 3101.

The roller conveying device 35 includes a catheter fixing part and a roller adjusting part. The catheter fixing part includes a linear actuator 3502, and the linear actuator 3502 is fixedly installed on the end connecting frame 3606 through a linear actuator bracket 3501. The linear actuator 3502 is in transmission connection with a push rod screw 3504 through a push rod screw coupling 3500. The push rod screw 3504 is fixedly installed on the end connecting frame 3606 through a push rod screw lower bracket 3524.

Two side of the linear actuator 3502 are respectively provided with a tracheal lower bracket stop block 3503. The two tracheal lower bracket stop blocks 3503 are abutted with tracheal lower brackets 3505. Each of the tracheal lower brackets 3505 is connected with the tracheal upper bracket 3506 through a rotating shaft and a spring. One side of the tracheal upper bracket 3506 is also fixedly installed on the end connecting plate 3605. The catheter 3104 penetrates the tracheal lower brackets 3505.

A push rod 3507 is mounted on the push rod screw 3504 in a transmission way. The push rod 3507 is provided with the roller adjusting part.

The roller adjusting part includes a bronchoscope lower stop block 3508, and the bronchoscope lower stop block 3508 is fixedly installed on a top of the push rod 3507. A bronchoscope upper stop block 3509 is also fixedly installed on the bronchoscope lower stop block 3508. One end of the push rod 3507 away from the push rod screw 3504 is fixedly provided with a propulsion slide plate 3514. A clamping motor 3513 is fixedly arranged on one side of the propulsion slide plate 3514. The clamping motor 3513 is in transmission connection with a clamping lead screw 3519 through a clamping lead screw coupling 3515. A clamping slider 3520 is slidably mounted on the clamping lead screw 3519. The clamping slider 3520 is slidably arranged on a clamping slide rail 3522, and the clamping slide rail 3522 is fixedly installed on a slide rail supporting plate 3518. The slide rail supporting plate 3518 is fixedly installed on the end connecting frame 3606.

The clamping lead screw 3519 is also penetrated with two roller brackets 3510 oppositely arranged. A roller 3516 is arranged in each of the two roller brackets 3510, and the bending part 3103 is clamped on the two rollers 3516. The rollers 3516 are driven by a roller motor 3511, and the roller motor 3511 is fixedly installed on a roller motor bracket 3512. The roller motor bracket 3512 is fixedly installed on a top of the roller bracket 3510. A bottom of the roller bracket 3510 is fixedly installed on the clamping slider 3520.

The propulsion slide plate 3514 is also fixedly installed on the propulsion slider 3517. The propulsion slider 3517 is slidably arranged on a propulsion slide rail 3523. One side of the propulsion slide plate 3514 is provided with a clamping limit photoelectric switch 3521 through a clamping limit photoelectric switch bracket 3526. Two ends of a direction of the slide rail supporting plate 3518 parallel to the push rod 3507 are respectively provided with a push rod back-end photoelectric switch 3525 and a push rod front-end photoelectric switch 3528. The propulsion slide plate 3514 is arranged above the slide rail supporting plate 3518, and a bottom surface of the propulsion slide plate 3514 is also fixedly provided with an end push rod limiting rod 3527. The end push rod limiting rod 3527 is placed between the push rod back-end photoelectric switch 3525 and the push rod front-end photoelectric switch 3528.

Figure 12:
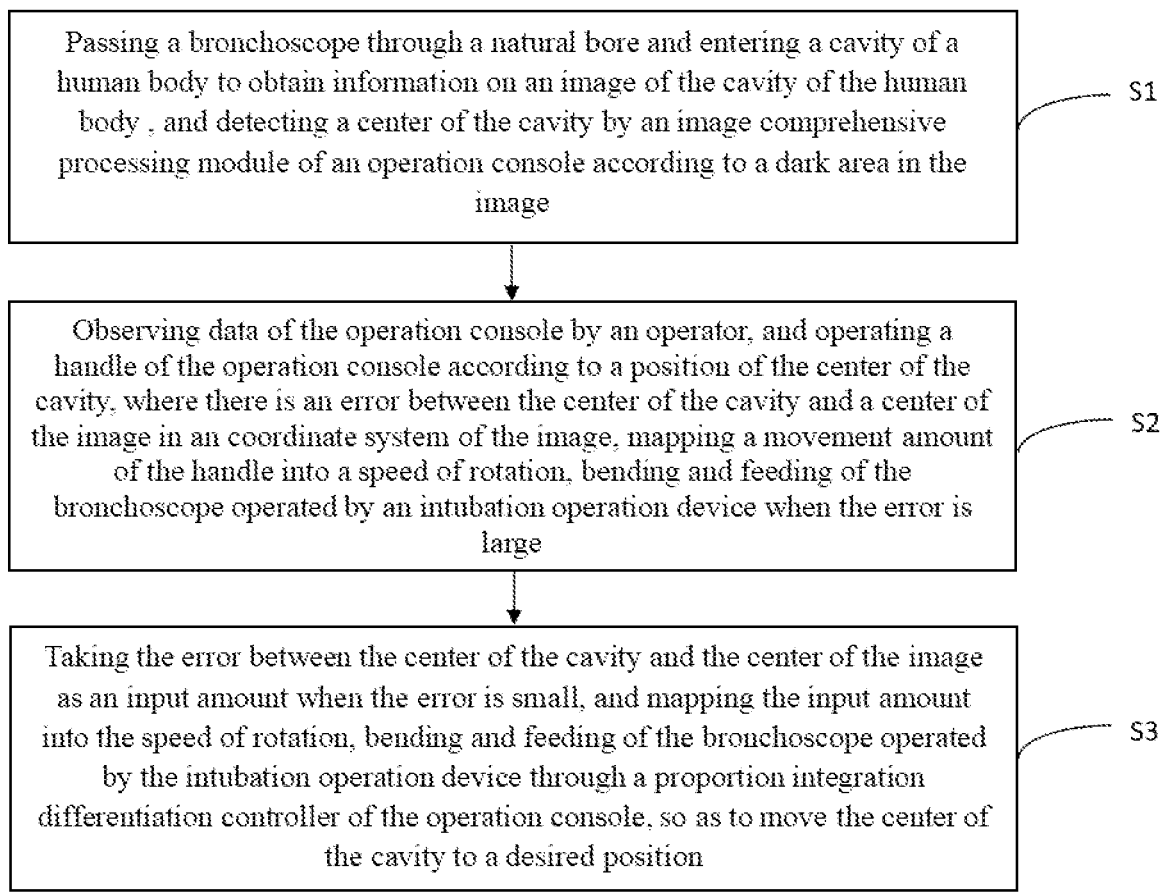
FIG. 12 is a flow chart of a control method of a robot system for nasotracheal intubation.

As shown in FIG. 12, a control method of a robot system for nasotracheal intubation includes following steps:
S1, passing a bronchoscope through a natural bore and entering a cavity of a human body to obtain information on an image of the cavity of the human body, and detecting a center of the cavity by an image comprehensive processing module of an operation console according to a dark area in the image;
S2, observing data of the operation console by an operator, and operating a control joystick on the operation console according to a position of the center of the cavity, wherein there is an error between the center of the cavity and a center of the image in an coordinate system of the image, mapping a movement amount of the control joystick into a speed of rotation, bending and feeding of the bronchoscope operated by an intubation operation device when the error is large; and
S3, taking the error between the center of the cavity and the center of the image as an input amount when the error is small, and mapping the input amount into the speed of rotation, bending and feeding of the bronchoscope operated by the intubation operation device through a proportion integration differentiation controller of the operation console, so as to move the center of the cavity to a desired position.

In one embodiment of the present application, in the S1, the center of the cavity is detected by segmenting the dark areas in the image. Firstly, the RGB (red, green, blue) images shot by the camera of bronchoscope are converted into gray images, and then the images are binarized by threshold segmentation algorithm to generate new images. The region with relatively low illumination intensity is segmented in the new images. Finally, the unreasonable area is filtered out and the best dark area is determined, and the center of the cavity is obtained by calculating the centroid of the dark area. In the control method of the S2 and the S3, firstly, when the pixel error is greater than a threshold value, the control amount of the control joystick to is mapped the speed at which the intubation operation device controls the bronchoscope to rotate and end of the bronchoscope to bend. When the pixel error is less than or equal to the threshold value, the pixel error is introduced into a feedback controller, and the speed at which the intubation operation device controls the bronchoscope to rotate and end of the bronchoscope to bend fed back from the feedback controller for the intubation operation device to control the bronchoscope.

In one embodiment of the application, this embodiment mainly simulates the process of tracheal intubation by a medical staff. First, the doctor puts the catheter 3104 into the scope body 3102 of the bronchoscope 31, and makes preparations before surgery. Secondly, the medical staff holds the operating part 3101 in one hand and controls the end of the bronchoscope to bend by thumbing the control knob 3105. The other one hand is located above the face of the patient, and the bronchoscope 31 and the catheter 3104 are inserted into the target position in the body of the patient in a step-by-step feeding manner by clamping the scope body 3102 and the catheter 3104 successively with fingers.

The above operation is realized by this system. The patient lies on the mobile operating bed 5 according to the requirements of the doctor, and the doctor adjusts the passive supporting arm 4 on the movable bracket 2 and the movable wheel of the mobile operating bed 5 as shown in FIG. 1 to adjust the positional relationship between the bronchoscope 31 and the patient. Then, the operating part of the bronchoscope is clamped by the bronchoscope conveying device 34. The feeding movement of the bronchoscope 31 and the catheter 3104 is realized by the bronchoscope conveying device 34. The bronchoscope 31 and the catheter 3104 are driven by the roller conveying device 35. In addition, during the feeding process of the bronchoscope 31 and the catheter 3104, it is necessary to rotate the bronchoscope 31 and the catheter 3104 due to the obstruction of tissues in the body of the patient, and the above operations are realized by the bronchoscope rotating device 33 and the bronchoscope bending device 32.

Specifically, the bronchoscope bending device 32 clamps the operating part of the bronchoscope by the cooperation of the clamping mechanism 3400 and the locking bracket 3402. The protruding part of the clamping mechanism 3400 is matched with feed slider connector 3403 through the fixing upper bracket 3401 and the fixing lower bracket 3404. The bronchoscope is fixed on the feed slider 3412 by the fixing action of the set screw. The clamping mechanism 3400 is connected with the knob-operated motor fixing bracket 3201 by bolts.

The bronchoscope rotating device is rotated by the rotating motor 3300, so that the catheter 3104 and the bronchoscope 31 are able to rotate at the same time.

The bronchoscope conveying device drives the feed screw 3407 through the feed motor 3413 to provide driving force for the linear motion of the feed slider 3412, and the feed slide rail 3405 sand restricts the feed slider 3412, so that the feed slider 3412 may move linearly in a fixed direction. Since the bronchoscope 31 and the clamping mechanism 3400 are fixed together, the feeding movement is realized.

The roller conveying device 35 is mainly divided into an end feeding section and an end pushing section. The end feeding section realizes the opening and closing movement of the roller bracket 3510 through driving the clamping lead screw 3519 by the clamping motor 3513 and drives the rollers 3516, the roller motor bracket 3512 and the roller motor 3511 to open and close, so as to adapt the bronchoscope 31 and the catheter 3104 with different sizes to pass between the two rollers, and give appropriate pre-tightening force. The roller motor 3511 directly drives the rollers 3516 to rotate, providing an appropriate feeding driving force for the bronchoscope 31 and the catheter 3104 between the two rollers 3516.

The pushing section of the roller conveying device 35 realize the reciprocating motion of the push rod 3507 through driving the push rod screw 3504 by the linear actuator 3502. The push rod 3507 is fixed with the propulsion slide plate 3514. When the push rod 3507 reciprocates, it drives the propulsion slide plate 3514 to move synchronously, so as to realize the reciprocating motion of the rollers 3516, which mainly simulates the doctor's action of pushing the bronchoscope 31 and the catheter 3104 in a step-by-step manner during tracheal intubation. In addition, when the bronchoscope 31 and the catheter 3104 encounter a large friction force during the feeding movement, the pushing movement is able to provide a large feeding driving force for the feeding movement of the bronchoscope 31 and the catheter 3104.

Referring to FIG. 11, the working principle of the robot system for nasotracheal intubation in this embodiment is as follows:

at the end of the bronchoscope 31 is an RGB camera, which transmits the collected image of the cavity of the human body to the workstation of the operation console 1 through Universal Serial Bus (USB)1. The workstation contains the image comprehensive processing system module. The image comprehensive processing system module includes a detection sub-module and a display sub-module (through a display screen). The detection module transmits the detected center of the cavity in a two-dimensional coordinate system to the surgical plan planning module and displays it on the display screen of the workstation.

The surgical plan planning module of the workstation calculates the detected the center of the cavity, that is, the operator inputs instructions to the workstation through the control joystick on the operation console, and the workstation outputs input instructions and the detected the center of the cavity subjected to algorithmic calculation by the surgical plan planning module to the slave control platform, that is, the control cabinet. The Zmotion controller in the control cabinet is conducted to the Epos driver, and finally to the controller motor. Specifically, the workstation firstly clamps the scope body 3102 through the Epos driver and the motor, then the motor controls the robot to rotate and bend the joints, so that the lens center of the camera is close to the center of the cavity, and then the auxiliary roller of the feed motor and roller conveying device is used to feed the bronchoscope until the trachea bulge appears on the display screen.

The clamping motor 3513 reverses the clamping lead screw 3519, the roller bracket 3510 is opened, and the clamping limit photoelectric switch 3521 is used to control the roller bracket 3510 to reach the preset position (that is, the position just shielding the photoelectric door). The catheter head is put between the two rollers, and the clamping motor 3513 is rotate forward to clamp the catheter.

The roller motor 3511 is used to rotate the rollers 3516, and the linear actuator 3502 pushes the push rod 3507, so that the catheter 3104 is fed with the scope body 3102 of bronchoscope as the support. When the end push rod limit rod 3527 touches push rod front-end photoelectric switch 3528, the rotation of the roller motor 3511 and the linear actuator 3502 is stopped, the clamping motor 3513 is rotate reversely, and the roller bracket 3510 is opened to a certain preset width. The linear actuator 3502 rotates reversely. When the end push rod limit rod 3527 touches the push rod back-end photoelectric switch 3525, the linear actuator 3502 stops rotating, and the clamping motor 3513 rotates forward. After clamping the catheter, the roller motor 3511 and the linear actuator 3502 rotate forward, and so on until the front end of the catheter appears in the display screen.

Further, the detection process of the center of the cavity is as follows: the image is processed by threshold segmentation algorithm and binarized. Then, the dark area O* being of relatively large and with relatively small gray value in the whole picture is calculated, and the centroid of this area is obtained to obtain the two-dimensional coordinate $P'_i=[p'_x, p'_y]$ of the center of the cavity in the image coordinate system. Here [x,y] represent the two-dimensional coordinates of all pixels in the dark area in which O* selected above belongs to in the image coordinate system. Finally, the detected center of the cavity is displayed on the display of the operation console to provide visual guidance for the operator.

The control method for controlling the intubation operation device by the control system specifically includes the following steps:

(1) the operator clicks "Start Remote Control" through the user interface on the display screen of the workstation, adjusts the roller bracket on the clamping mechanism to the position of shielding the photoelectric door by clicking the key B of the control joystick (the user interface shows a pop-up window: has reached the position), and then clicks the key X to make the clamping mechanism clamp the bronchoscope;

(2) the operator operates the bronchoscope according to the visual navigation, uses the left rocker to feed the bronchoscope, uses the right rocker to bend and rotate the bronchoscope when the pixel error is greater than a threshold, and when the pixel error is less than or equal to a threshold, the robot fine-tunes the bronchoscope by itself, and displays "The robot is fine-tuning the bronchoscope" on the user interface until the trachea bulge appears on the user interface of the display screen, and the bronchoscope stops feeding;

(3) the operator clicks the key B on the control joystick to open the roller bracket, clicks the key Y to make the clamping mechanism clamp the tracheal catheter, and finally clicks the key A to start the pushing-releasing mechanism and the rollers to make the catheter feed until the front end of the trachea appears on the display screen.

In the description of the present application, it should be understood that the orientation or positional relationship indicated by terms "longitudinal", "transverse", "upper", "lower", "front", "rear", "left", "right", "vertical", "horizontal", "top", "bottom", "inner", "outer", etc. is based on the orientation or positional relationship shown in the drawings, and is only for the convenience of describing the present application, rather than indicating or implying that the device or element referred to must have a particular orientation, be constructed and operate in a particular orientation, and therefore should not be understood as limiting the application.

The above-mentioned embodiments only describe the preferred mode of the application, and do not limit the scope of the application. Under the premise of not departing from the design spirit of the application, various modifications and improvements made by ordinary technicians in the field to the technical scheme of the application shall fall within the protection scope defined by the claims of the application.

What is claimed is:

1. A robot system for a nasotracheal intubation, comprising:
   an operation console;
   a mobile operating bed for supporting a patient;
   a passive supporting arm; and
   an intubation operation device, wherein the intubation operation device is arranged at a bedside end of the mobile operating bed through the passive supporting arm; and the intubation operation device comprises:
   a bronchoscope,
   a catheter connected with the bronchoscope,
   a bronchoscope bending device for controlling a tip of the bronchoscope to bend,
   a bronchoscope rotating device for controlling the bronchoscope to rotate integrally,
   a bronchoscope conveying device for controlling the bronchoscope to feed and withdraw, and
   a roller conveying device for controlling the catheter to feed;
   wherein the intubation operation device is installed on the passive supporting arm through a supporting frame; and the tip of the bronchoscope is configured to reach a position of a nasal cavity of the patient when the patient lies on the mobile operating bed;
   wherein the bronchoscope comprises:
   a display; and
   a scope body;
   wherein the display and the scope body are connected through an operating part; a control knob is rotatably mounted on the operating part, and the bronchoscope bending device is configured to control a bending part to bend through the control knob;
   the scope body is provided with the catheter, and an extended end of the scope body is formed with the bending part; and
   the operating part is supported on the bronchoscope conveying device, the bronchoscope conveying device is fixedly installed on the bronchoscope rotating device, one end of the catheter is defined on the bronchoscope rotating device, and another end of the catheter and the bending part are defined on the roller conveying device;
   wherein the supporting frame comprises:
   a rotating motor supporting bracket for fixing a rotating motor in the bronchoscope rotating device, and
   a bottom plate and a mechanical arm connector both for connecting with the passive supporting arm;
   wherein one end of the bottom plate is fixedly connected with the rotating motor supporting bracket through an upper bearing seat, another end of the bottom plate is connected with an end connecting plate through a lower bearing seat, and the end connecting plate is fixedly connected with an end connecting frame for supporting the roller conveying device;
   wherein the bronchoscope bending device comprises:
   a knob-operated motor,
   wherein the knob-operated motor is fixedly installed on one side of a knob-operated motor fixing bracket, and another side of the knob-operated motor fixing bracket is provided with a knob motor connector fixedly connected with an output end of the knob-operated motor, the knob motor connector is internally provided with an embedding groove, a control knob is fixedly installed in the embedding groove, and the knob-operated motor fixing bracket is installed on a clamping mechanism of the bronchoscope conveying device;

wherein the bronchoscope rotating device comprises:
a rotating motor coupling coaxially arranged with the rotating motor, wherein the rotating motor is in transmission connection with an upper main bracket coupling connector through the rotating motor coupling, and the upper main bracket coupling connector is installed in the upper bearing seat, and wherein the upper main bracket coupling connector is also fixedly connected with an upper main bracket;
the upper main bracket is fixedly connected with a lower main bracket through a supporting plate; and
the lower main bracket is provided with an installation hole for fixing the catheter, the catheter is rotatably installed in the lower bearing seat, and the upper main bracket and the lower main bracket are both defined above the supporting plate; and wherein the bronchoscope conveying device comprises:
the clamping mechanism; and
two feed slide rails;
wherein both ends of the feed slide rails are respectively fixedly installed at bottoms of the upper main bracket and the lower main bracket, a feed slider is slidably arranged on the two feed slide rails, the clamping mechanism is installed on the feed slider through a feed slider connector, the feed slider is fixedly installed on a feed screw nut, the feed screw nut is slidably installed on a feed screw, two sides of the feed screw are respectively provided with a feed screw upper end bracket and a feed screw lower end bracket, the feed screw lower end bracket is fixedly connected with a side wall of the lower main bracket, the feed screw is also in transmission connection with a feed motor through a feed screw coupling, the feed screw coupling is fixedly connected with the feed screw upper end bracket, and the feed screw is fixedly installed at a bottom of the feed slide rails through a feed motor bracket.

2. The robot system for a nasotracheal intubation according to claim 1, wherein the clamping mechanism comprises:
a fixing upper bracket and a fixing lower bracket both mounted on the feed slider connector; wherein tops of the fixing upper bracket and the fixing lower bracket are jointly provided with a connecting rod;
the connecting rod is connected with a locking bracket by threads, and the locking bracket penetrates through the operating part;
an end of the connecting rod is also rotatably connected with a clamping frame through a rotating shaft; and
the clamping frame is fixedly connected with the operating part.

3. The robot system for a nasotracheal intubation according to claim 1, wherein the roller conveying device comprises;
a catheter fixing part; and
a roller adjusting part;
wherein the catheter fixing part comprises a linear actuator, and the linear actuator is fixedly installed on the end connecting frame through a linear actuator bracket;
the linear actuator is in transmission connection with a push rod screw through a push rod screw coupling; and
the push rod screw is fixedly installed on the end connecting frame through a push rod screw lower bracket;
two sides of the linear actuator are respectively provided with a tracheal lower bracket stop blocks;

the tracheal lower bracket stop blocks are abutted with tracheal lower brackets;
each of the tracheal lower brackets is connected with the tracheal upper bracket through a rotating shaft and a spring;
one side of the tracheal upper bracket is also fixedly installed on the end connecting plate;
the catheter penetrates the tracheal lower brackets;
a push rod is mounted on the push rod screw in a transmission way; and
the push rod is provided with the roller adjusting part.

4. The robot system for a nasotracheal intubation according to claim 3, wherein the roller adjusting part comprises a bronchoscope lower stop block, and the bronchoscope lower stop block is fixedly installed on a top of the push rod;
a bronchoscope upper stop block is also fixedly installed on the bronchoscope lower stop block;
one end of the push rod away from the push rod screw is fixedly provided with a propulsion slide plate;
a clamping motor is fixedly arranged on one side of the propulsion slide plate;
the clamping motor is in transmission connection with a clamping lead screw through a clamping lead screw coupling;
a clamping slider is slidably mounted on the clamping lead screw;
the clamping slider is slidably arranged on a clamping slide rail, and the clamping slide rail is fixedly installed on a slide rail supporting plate; and
the slide rail supporting plate is fixedly installed on the end connecting frame;
the clamping lead screw is also penetrated with two roller brackets oppositely arranged;
a roller is arranged in each of the two roller brackets, and the bending part is clamped on two rollers;
the rollers are driven by a roller motor, and the roller motor is fixedly installed on a roller motor bracket;
the roller motor bracket is fixedly installed on a top of the roller bracket;
a bottom of the roller bracket is fixedly installed on the clamping slider; and
the propulsion slide plate is also fixedly installed on the propulsion slider;
the propulsion slider is slidably arranged on a propulsion slide rail;
one side of the propulsion slide plate is provided with a clamping limit photoelectric switch through a clamping limit photoelectric switch bracket;
two ends of a direction of the slide rail supporting plate parallel to the push rod are respectively provided with a push rod back-end photoelectric switch and a push rod front-end photoelectric switch;
the propulsion slide plate is arranged above the slide rail supporting plate, and
a bottom surface of the propulsion slide plate is also fixedly provided with an end push rod limiting rod; and
the end push rod limiting rod is placed between the push rod back-end photoelectric switch and the push rod front-end photoelectric switch.

5. A control method of a robot system for a nasotracheal intubation, comprising the robot system for the nasotracheal intubation according to claim 1, comprising following steps:
S1, passing a bronchoscope through a natural bore and entering a cavity of a human body to obtain information on an image of the cavity of the human body, and detecting a center of the cavity by an image comprehensive processing module of an operation console according to a dark area in the image;

S2, observing data of the operation console by an operator, and operating a control joystick on the operation console according to a position of the center of the cavity, wherein there is an error between the center of the cavity and a center of the image in a coordinate system of the image, mapping a movement amount of the control joystick into a speed of rotation, bending and feeding of the bronchoscope operated by an intubation operation device when the error is large; and S3, taking the error between the center of the cavity and the center of the image as an input amount when the error is small, and mapping the input amount into the speed of rotation, bending and feeding of the bronchoscope operated by the intubation operation device through a proportion integration differentiation controller of the operation console, so as to move the center of the cavity to a desired position.

\* \* \* \* \*